United States Patent [19]
Lebret

[11] Patent Number: 5,487,597
[45] Date of Patent: Jan. 30, 1996

[54] HYDRAULIC CIRCUIT WITH A CAPACITY FORMING A DISTRIBUTOR

[75] Inventor: Pierre Lebret, Le Chesnay, France

[73] Assignee: AlliedSignal Europe Services Technique, Drancy, France

[21] Appl. No.: 244,168

[22] PCT Filed: Apr. 23, 1994

[86] PCT No.: PCT/FR94/00466

§ 371 Date: May 20, 1994

§ 102(e) Date: May 20, 1994

[87] PCT Pub. No.: WO94/27849

PCT Pub. Date: Dec. 8, 1994

[30] Foreign Application Priority Data

May 25, 1993 [FR] France ................. 93 06181

[51] Int. Cl.$^6$ ................................. B60T 13/18
[52] U.S. Cl. ............................. 303/116.2; 303/10
[58] Field of Search ................. 303/10, 11, 20, 303/113.1, 115.1, 115.4, 115.5, 116.1, 116.2, 901

[56] References Cited

U.S. PATENT DOCUMENTS 5,152,586  10/1992  Burgdorf ................. 303/116.1 X

FOREIGN PATENT DOCUMENTS

| | | |
|---|---|---|
| 539899 | 5/1993 | European Pat. Off. . |
| 3943168 | 7/1990 | Germany ................. 303/115.4 |
| 3940177 | 6/1991 | Germany . |
| 4205041 | 8/1992 | Germany . |
| 4119142 | 12/1992 | Germany . |
| 1122762 | 5/1989 | Japan ................. 303/116.1 |
| 4008656 | 1/1992 | Japan ................. 303/116.2 |
| 5-65057 | 5/1993 | Japan . |
| 92/16399 | 10/1992 | WIPO . |

*Primary Examiner*—Robert J. Oberleitner
*Assistant Examiner*—Alfred Muratori
*Attorney, Agent, or Firm*—Leo H. McCormick, Jr.; Larry J. Palguta

[57] ABSTRACT

A hydraulic brake circuit is intended for a motor vehicle provided at least with an electrically pilot-controlled braking function, and including at least a master cylinder (1), an electric pump (2), first and second brake motors (3, 4), first and second respective solenoid valves (5, 6), and a low-pressure capacity (7). In addition to a conventional accumulation chamber (8), the capacity (7) comprises an access chamber (13) which interacts with the accumulation chamber (8) to form a simplified distributor which offers additional switching options which can be used for a new braking function.

8 Claims, 1 Drawing Sheet

HYDRAULIC CIRCUIT WITH A CAPACITY FORMING A DISTRIBUTOR

BACKGROUND OF THE INVENTION

The present invention relates to a hydraulic brake circuit intended to equip a motor vehicle provided with at least one electrically pilot-controlled braking function, and including at least one master cylinder, an electric pump, first and second brake motors, first and second respective solenoid valves, and a low-pressure capacity, this capacity comprising a variable-volume accumulation chamber which is connected to the remainder of the circuit by an inlet and is defined within a cylinder by a piston stressed towards this inlet by means of a first spring generating a first force which acts in a direction capable of reducing the volume of this chamber to a minimum value.

Hydraulic circuits of this type have been known for a long time and equip all vehicles provided, for example, with an antilock braking function.

A problem commonly encountered in the design of circuits of this type concerns the reduction in their degree of complexity, in particular with a view to reduced costs and increased reliability.

In particular, the reduction of the number of active members, such as the solenoid valves, or of members with a complex structure such as the slide-valve distributors, is a constant object in the design of new brake circuits provided with at least one electrically pilot-controlled braking function.

Such is the context for the present invention which provides means for carrying out simply a plurality of functions in this type of circuit.

SUMMARY OF THE INVENTION

More precisely, the hydraulic circuit of the invention is essentially characterized in that the capacity comprises, in addition to the accumulation chamber, an access chamber which has first and second inlets and an outlet communicating with the inlet of the communication chamber, in that a sealing member, which can move between first and second extreme positions, is arranged in the access chamber in order selectively to the first inlet of the access chamber in its first position and the outlet of the access chamber in its second position, in that this sealing member is selectively placed in its first position by the first spring acting on this member via the piston when the volume of the accumulation chamber is close to the minimum value, in that this sealing member is placed in its second position by a second spring acting counter to the first spring and generating a second force smaller than the first force, when the volume of the accumulation chamber is substantially greater than its minimum value, and in that the second inlet is in permanent communication with the inside of the access chamber.

By virtue of this arrangement, the accumulation chamber constitutes a true state-memory facility for the hydraulic circuit, which can be used directly by the simplified distributor constituted by the access chamber.

In a preferred application of the essential features outlined above, the outlet of the access chamber has a sealing cross section which is smaller than the cross section of the piston, and the first inlet of the access chamber has a sealing cross section which is smaller than that of the outlet of this chamber.

The invention can, for example, make it possible, without the addition of any active element, to perform an antiskid function on a vehicle which is initially provided just with an antilock function.

In this case, the first inlet of the access chamber is connected to the outlet of the pump, on the one hand, and at least to the inlet of the first brake motor, on the other hand, via the first solenoid valve, and the second inlet of the access chamber is connected to the outlet of the master cylinder.

Moreover, the inlet of the accumulation chamber is connected to the inlet of the pump, and the outlet of the master cylinder may be connected to the second brake motor via a non-return valve preventing flow towards the master cylinder.

Lastly, it is possible to arrange for the outlet of the master cylinder to be connected to the first inlet of the access chamber by a non-return valve preventing flow towards this first inlet.

DESCRIPTION OF THE DRAWINGS

The invention will now be described by way of example with reference to the accompanying drawings, in which.

DESCRIPTION OF THE INVENTION

Figure 1:
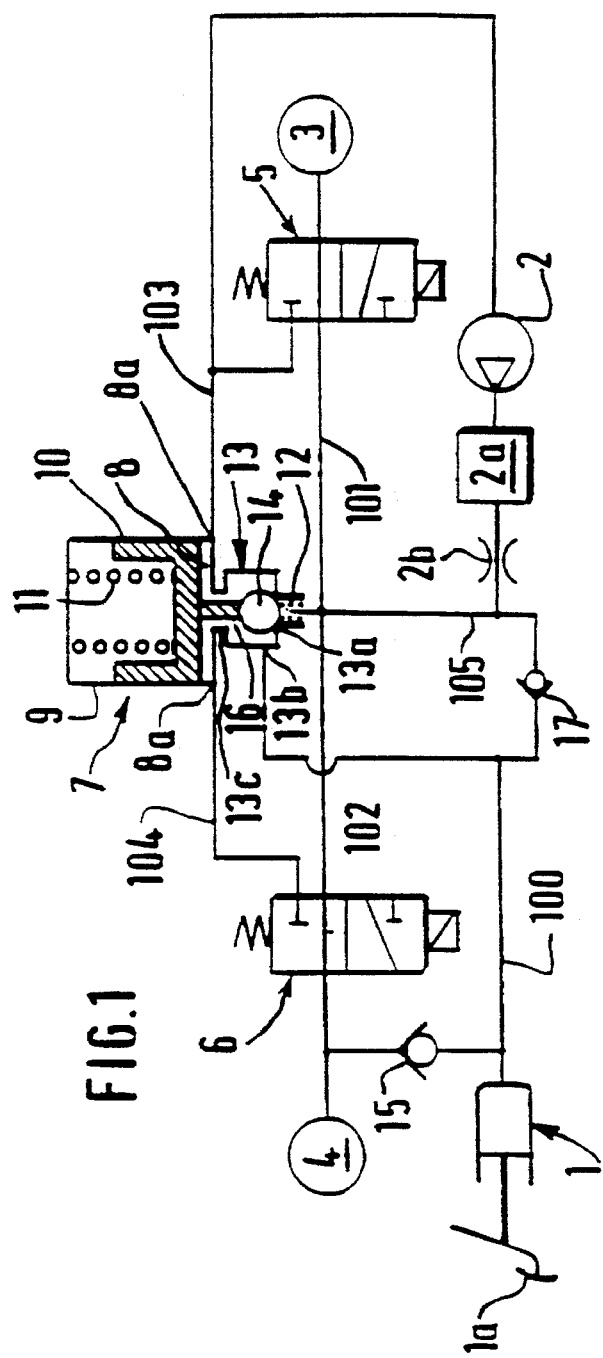
FIG. 1 is a diagram illustrating a complete circuit according to the invention.

The invention relates to a hydraulic brake circuit intended to equip a motor vehicle provided with at least one electrically pilot-controlled braking function, and including at least (FIG. 1) a master cylinder 1, an electric pump 2, first and second brake motors 3 and 4, first and second respective solenoid valves 5 and 6, and a low-pressure capacity 7.

These elements are connected by hydraulic ducts such as 100, 101, 102, 103, 104 and 105, these elements and ducts together forming the circuit in question.

To be more precise, the master cylinder 1, which can be actuated by a brake pedal 1a, is connected to the front brake motor 3 and to the rear brake motor 4 by means of the ducts 100, 101, and 102 by means of the respective solenoid valves 5 and 6.

In the rest state, these solenoid valves bring these ducts 101 and 102 into direct communication with the brake motors 3 and 4, as illustrated in FIG. 1.

The outlet of the pump 2 is itself connected to the two ducts 101 and 102 via a buffer volume 2a, a restriction 2b and the duct 105, whilst the inlet of the pump 2 is connected to an inlet 8a of a variable-volume accumulation chamber 8 of the capacity 7, which chamber is in turn capable of being selectively connected to the brake motors 3 and 4 via respective ducts 103 and 104 by means of the solenoid valves 5 and 6.

The accumulation chamber 8 is defined within a cylinder 9 of this capacity by a piston 10 which is stressed towards the inlet 8a by means of a first spring 11 which generates a first force acting in a direction capable of reducing the volume of this chamber to a minimum value which may be zero.

According to the invention, the capacity 7 furthermore comprises an access chamber 13 having first and second inlets 13a, 13b and an outlet 13c communicating with the inlet 8a of the accumulation chamber 8.

A sealing member 14, which can move between first and second extreme positions, is arranged in the access chamber 13 in order to seal the first inlet 13a of the access chamber 13 in its first position (that shown in the figure) and to seal the outlet 13c of the access chamber 13 in its second position.

Figure 2:
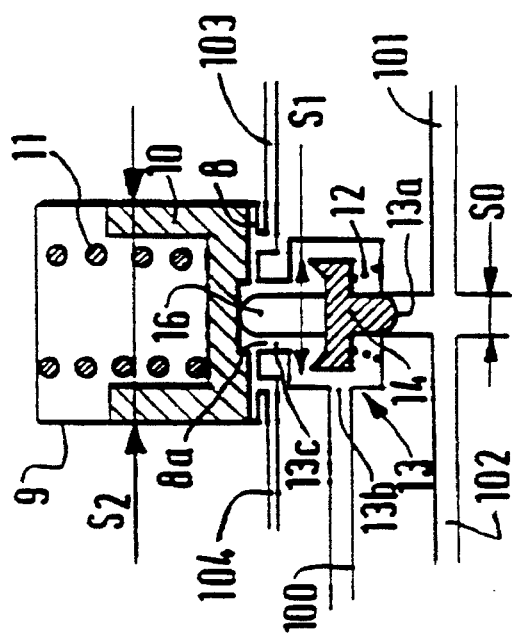
FIG. 2 is a detailed view of a particular embodiment of a capacity intended to be incorporated in a circuit according to the invention.

As shown in the figures, the sealing member 14 is selectively placed in its first position by the first spring 11 which pushes it, when the volume of the accumulation chamber 13 is close to its minimum value, by means of the piston 11 and possibly of a finger 16 integral with this piston (FIG. 1) or with the sealing member 14 (FIG. 2).

When the volume of the accumulation chamber 13 is substantially greater than its minimum value, the sealing member 14 is in contrast placed in its second position by a second spring 12 which acts counter to the first spring 11 and which generates a second force smaller than the first force.

The second inlet 13b of the access chamber 13, which is connected to the master cylinder 1, is for its part in permanent communication with the inside of this access chamber.

In the absence of the elements 12 and 14, corresponding to free communication of the ducts 100, 101, 102 and 105, the circuit described makes it possible, for example, to perform, in a manner known per se, an antilock braking on the front and rear wheels, corresponding to the respective brake motors 3 and 4.

To be more precise, normal braking is achieved by a rise in the pressure of the hydraulic fluid in the ducts 100, 101 and 102, resulting from the actuation of the master cylinder 1 by the driver, and being propagated via the solenoid valves 5 and 6, then in their rest state as illustrated in FIG. 1. Automatic braking, in an antilock braking sequence, is performed by the pump via the duct 105 and via the solenoid valves in their rest state. Lastly, automatic releasing of the brakes in an antilock braking sequence is achieved by selective excitation of the solenoid valves and by bringing the brake motors in question into communication with the capacity 7.

An additional braking function, for example antiskid braking of the front wheel controlled by the brake motor 3, can be achieved simply by adding the elements 12 to 14 in accordance with the invention.

The complete circuit functions as follows.

In the case of normal braking by the driver, the rise in the pressure in the duct 100 causes the piston 10 to be displaced counter to the force exerted by the spring 11.

Because the finger 16 then frees the sealing member 14, the latter closes the outlet 13c of the access chamber 13 under the effect of the second spring 12, and opens the first inlet 13a. Under these conditions, the master cylinder is brought into communication, via the solenoid valves 5 and 6, with the brake motors 3 and 4 which it actuates.

By virtue of the invention it is, however, possible, even in the absence of any intervention on the part of the driver, to cause, for example, the actuation of the brake motor 3 to prevent the skidding of the front wheel controlled by this brake motor.

To this end, it is indeed sufficient to start up the pump 2 by exciting the second solenoid valve 6 and by leaving the first solenoid valve 5 in the rest state. Under these conditions, the pump draws off, in order of priority, any fluid present in the accumulation chamber 8, then the fluid present in the master cylinder, which circulates through the duct 100, the second inlet 13b of the access chamber 13, the outlet 13c of this chamber, and the duct 103.

The fluid discharged by the pump reaches the brake motor 3 through the ducts 105 and 101, but returns into the accumulation chamber 8 through the first inlet 13a of the access chamber if the pressure of this fluid enables it to overcome the forces which are exerted on the sealing member 14 in the closing direction of the first inlet 13a, the pressure of the pump thus being regulated.

The mode of operation described is modulated by parameters which are advantageously chosen as follows.

The outlet 13c of the access chamber can have, for the sealing member 14, a sealing cross section S1 which is smaller than the cross section S2 of the piston 10, for example the order of one third, but is preferably substantially greater than the sealing cross section So of the first inlet 13a of this chamber, the cross section S1 being, for example, of the order of at least ten times So.

Furthermore, the outlet of the master cylinder is advantageously connected to the second brake motor 4 via a non-return valve 15 mounted so as to prevent flow towards the master cylinder, so as to enable the first brake motor 3 to return to its rest state after the conditions requiring its actuation by the pump 2 have ceased to exist.

Lastly, it is also possible to connect the duct 100 to the duct 105 by a non-return valve 17 preventing flow towards the duct 100 in order to have available an additional fluid circulation passage between the master cylinder 1 and the brake motors, in addition to that which traverses the access chamber 13.

I claim:

1. A hydraulic brake circuit for a motor vehicle provided with at least an electrically pilot-controlled braking function, and including at least a master cylinder, an electric pump, first and second brake motors, first and second respective solenoid valves, and a low-pressure capacity comprising a variable volume accumulation chamber connected to a remainder of the circuit by an inlet and defined within a cylinder by a piston which is stressed toward the inlet by means of a first spring generating a first force acting in a direction capable of reducing the volume of the chamber to a minimum value, characterized in that the capacity furthermore comprises an access chamber having first and second inlets and an outlet communicating with the inlet of the accumulation chamber, in that a sealing member, which can move between first and second extreme positions, is arranged in the access chamber in order to seal selectively the first inlet of the access chamber in a first position, and the outlet of the access chamber in a second position, in that the sealing member is placed selectively in the first position by the first spring acting on the sealing member by means of the piston when the volume of the accumulation chamber is close to the minimum value, in that the sealing member is placed in the second position by a second spring acting counter to the first spring and generating a second force which is smaller than the first force, when the volume of the accumulation chamber is substantially greater than the minimum value, and in that the second inlet is in permanent communication with an inside of the access chamber.

2. The hydraulic circuit according to claim 1, characterized in that the outlet of the access chamber has a sealing cross section smaller than a cross section of the piston.

3. The hydraulic circuit according to claim 2, characterized in that the first inlet of the access chamber has a sealing cross section which is smaller than a cross section of the outlet of the access chamber.

4. The hydraulic circuit according to claim 3, characterized in that the first inlet of the access chamber is connected to an outlet of the pump and at least to an inlet of the first brake motor, via the first solenoid valve.

5. The hydraulic circuit according to claim 4, characterized in that the second inlet of the access chamber is connected to an outlet of the master cylinder.

6. The hydraulic circuit according to claim 5, characterized in that the inlet of the accumulation chamber is connected to an inlet of the pump.

7. The hydraulic circuit according to claim 6, characterized in that the outlet of the master cylinder is connected to the second brake motor via a non-return valve preventing flow toward the master cylinder.

8. The hydraulic circuit according to claim 7, characterized in that the outlet of the master cylinder is connected to the first inlet of the access chamber by a non-return valve allowing flow toward the first inlet of the access chamber.

\* \* \* \* \*